United States Patent
Park

(10) Patent No.: US 7,672,290 B2
(45) Date of Patent: Mar. 2, 2010

(54) DUAL-MODE MOBILE TERMINAL AND METHOD FOR DISPLAYING TIME INFORMATION

(75) Inventor: Jae-Sun Park, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 653 days.

(21) Appl. No.: 10/925,621

(22) Filed: Aug. 25, 2004

(65) Prior Publication Data

US 2005/0152311 A1    Jul. 14, 2005

(30) Foreign Application Priority Data

Jan. 14, 2004    (KR)    ........................ 10-2004-0002663

(51) Int. Cl.
*H04J 3/06*    (2006.01)
(52) U.S. Cl. .................. 370/350; 455/552.1; 455/553.1
(58) Field of Classification Search .............. 455/435.1, 455/435.2, 552.1, 553.1; 370/350
See application file for complete search history.

(56) References Cited

U.S. PATENT DOCUMENTS 6,477,372 B1 * 11/2002 Otting et al. ................. 455/434
2002/0068574 A1 * 6/2002 Vestergaard et al. ......... 455/445
2002/0187804 A1 * 12/2002 Narasimha et al. .......... 455/552
2003/0211862 A1 * 11/2003 Hutchison et al. ......... 455/552.1
2004/0185899 A1 * 9/2004 Hayem et al. ............. 455/552.1

\* cited by examiner

*Primary Examiner*—Lester Kincaid
*Assistant Examiner*—Steven Lim
(74) *Attorney, Agent, or Firm*—The Farrell Law Firm, LLP

(57) ABSTRACT

A dual-mode mobile terminal that connects to synchronous and asynchronous mobile communication systems and a method for displaying accurate time information in the terminal. The terminal includes a timer and a controller. The timer generates an interrupt signal at a predetermined time. When entering an asynchronous communication mode, the controller starts the timer to generate the interrupt signal at the predetermined time. When receiving the interrupt signal from the timer, the controller connects to the synchronous mobile communication system to obtain accurate time information therefrom and then connects to the asynchronous mobile communication system to switch to the asynchronous communication mode.

8 Claims, 4 Drawing Sheets

DUAL-MODE MOBILE TERMINAL AND METHOD FOR DISPLAYING TIME INFORMATION

PRIORITY

This application claims priority to an application entitled "DUAL-MODE MOBILE TERMINAL AND METHOD FOR DISPLAYING TIME INFORMATION", filed in the Korean Intellectual Property Office on Jan. 14, 2004 and assigned Serial No. 2004-0002663, the contents of which are incorporated herein by reference.

BACKGROUND OF THE INVENTION

1. Field of the Invention

The present invention relates generally to a mobile terminal, and more particularly to a dual-mode mobile terminal supporting both synchronous and asynchronous modes.

2. Description of the Related Art

Recently, the use of mobile terminals has rapidly increased around the world. Mobile communication systems, which provide communication services to the mobile terminals, are generally divided into a global system for mobile communication (GSM) mobile communication system, which is primarily used in Europe, and a Code Division Multiple Access (CDMA) mobile communication system, which is primarily used in North America. The CDMA mobile communication system utilizes a synchronous data transmission mode and the GSM mobile communication system utilizes an asynchronous data transmission mode. The synchronous mode synchronizes a transmitter and a receiver using an American GPS satellite, whereas the asynchronous mode synchronizes the two using a special chip or software.

In the synchronous CDMA mobile communication system, a CDMA mobile terminal obtains accurate current time for synchronization. In the asynchronous GSM mobile system, a GSM mobile terminal cannot obtain accurate current time, such that the GSM mobile terminal must receive a current time that is adjusted and input by the user, and uses a clock generator to update and display the current time as time passes.

In some areas, both the synchronous CDMA mobile communication system and the asynchronous GSM mobile communication system provide mobile communication services. Conventionally, in such areas where the CDMA and GSM mobile communication systems are used together, users needed to have CDMA terminals if they wished to receive CDMA services or GSM terminals if they wished to receive GSM services. Recently, however, a dual-mode mobile terminal, which can access both the synchronous CDMA and asynchronous GSM mobile communication systems has been developed.

When the dual-mode mobile terminal is in the synchronous CDMA mode, the terminal can accurately display current time because it obtains accurate current time for synchronization. However, when the dual-mode mobile terminal is in asynchronous GSM mode, because the terminal receives current time adjusted and input by the user and uses the clock generator to update and display the current time as time passes, the terminal cannot accurately display the current time if the terminal receives incorrect time information from the user or if the clock generator malfunctions.

SUMMARY OF THE INVENTION

Therefore, the present invention has been designed in view of the above and other problem, and it is an object of the present invention to provide a dual-mode terminal and a method for always providing accurate time information to the user, regardless of operating mode.

In accordance with the present invention, the above and other objects can be accomplished by a dual-mode mobile terminal capable of connecting to a synchronous mobile communication system and an asynchronous mobile communication system. The terminal includes: a timer for generating an interrupt signal at a predetermined time; and a controller for starting the timer when entering an asynchronous communication mode, and connecting to the synchronous mobile communication system to obtain accurate time information therefrom when receiving an interrupt signal from the timer, and then connecting to the asynchronous mobile communication system to switch to the asynchronous communication mode.

Preferably, when the terminal is powered on in the asynchronous mode, the controller first switches to the synchronous mode to obtain current time information and switches back to the initial service mode (i.e., asynchronous mode) after updating the current time with the obtained time information. Thereafter, the controller periodically updates the current time using the timer.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail hereinbelow with reference to the annexed drawings. In the following description, a detailed description of known functions and configurations incorporated herein will be omitted when it may obscure the subject matter of the present invention.

Figure 1:
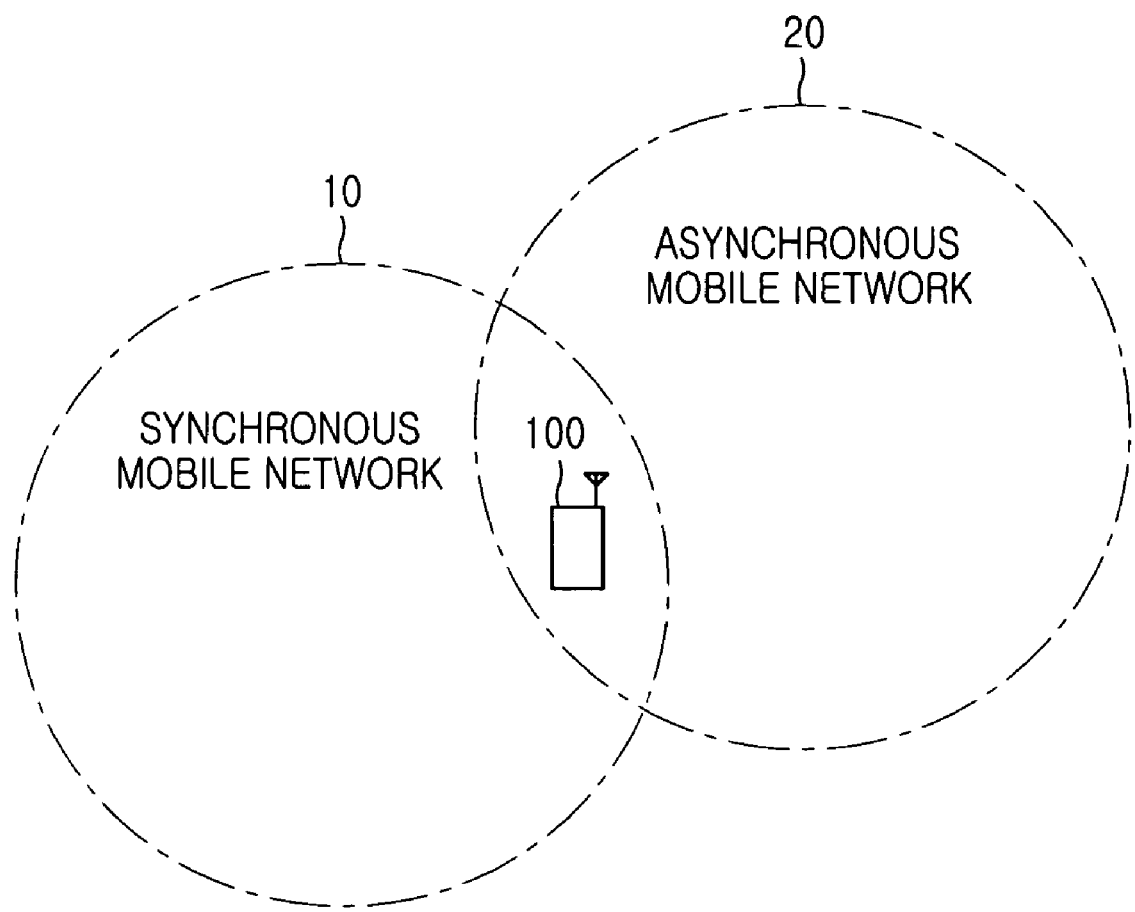
FIG. 1 is a diagram illustrating service areas of mobile communication systems that are accessible by a dual-mode mobile terminal according to the present invention.

FIG. 1 is a diagram illustrating service areas of mobile communication systems that are accessible by a dual-mode mobile terminal according to the present invention. As illustrated in FIG. 1, a dual-mode mobile terminal 100 is positioned in a service area covered by both a synchronous mobile communication system 10 and an asynchronous mobile communication system 20. In the present invention, the dual-mode terminal 100 accesses one of the synchronous or the asynchronous communication systems and receives communication services therefrom. More specifically, when the dual-mode mobile terminal 100 is in a CDMA mode, it can receive a call, an SMS (Short Message Services) message, and various other information from the synchronous communication system 10. Likewise, when the dual-mode mobile communication terminal 100 is in a GSM mode, it can receive a call, an SMS message and various other information from the asynchronous communication system 20. Preferably, the user of the dual-mode terminal 100 can select a desired one of the synchronous and asynchronous communication systems 10 and 20 and transmit a call to the selected system.

According to the present invention, if the dual-mode terminal 100 is currently connected to the GSM mobile communication system, the dual-mode terminal 100 periodically connects to the CDMA mobile communication system to obtain an accurate current time. Even in the GSM mode, if the terminal 100 is located in an area where it can connect to the CDMA mobile communication system, the terminal 100 periodically connects to the CDMA mobile communication system to obtain an accurate current time. Based on the obtained accurate current time, the dual-mode terminal 100 corrects its time information to be displayed to the user, and then reconnects to the GSM mobile communication system. In this manner, the user of the dual-mode terminal can always receive accurate time information.

Figure 2:
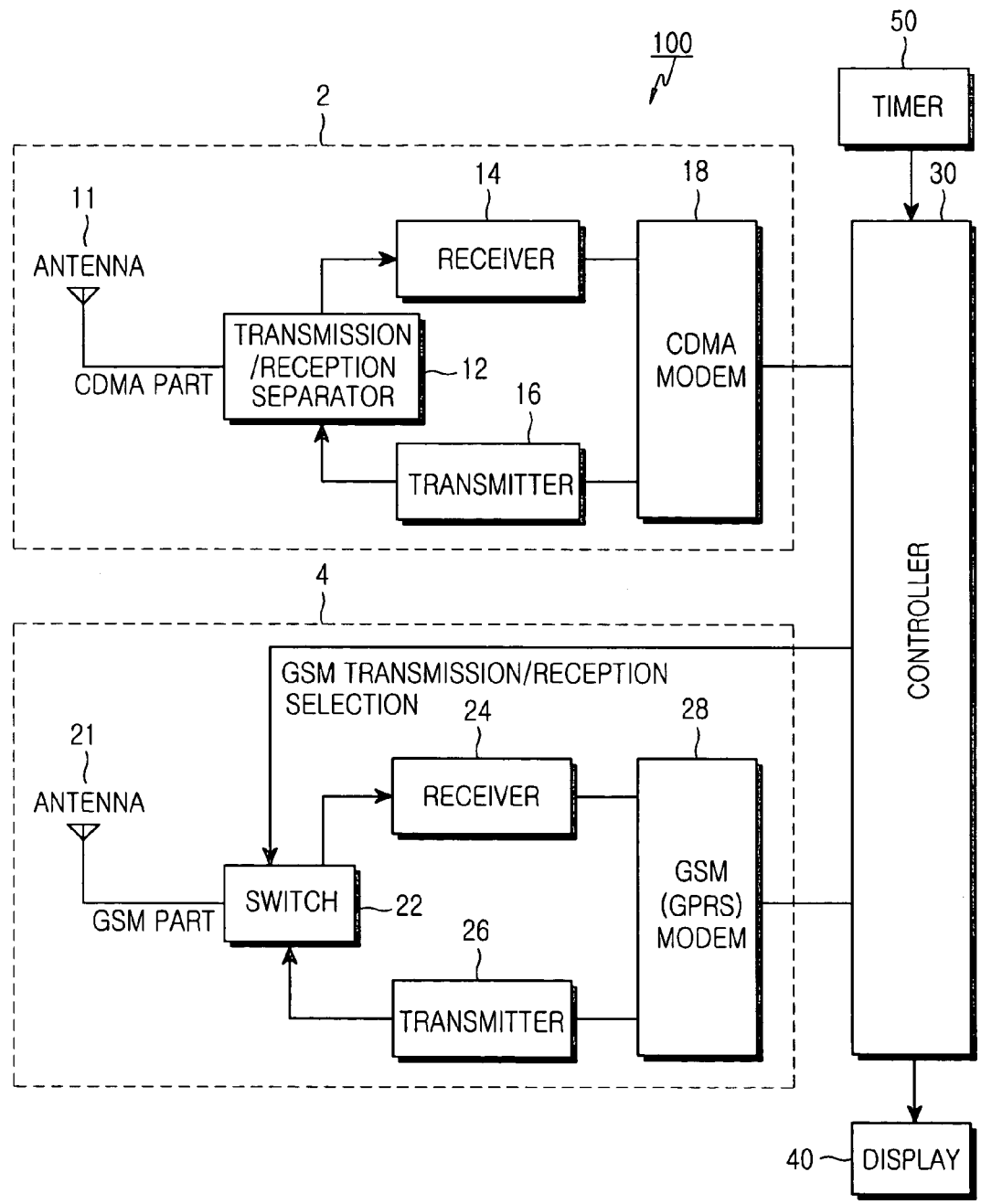
FIG. 2 is a block diagram illustrating a dual-mode mobile terminal according to an embodiment of the present invention.

FIG. 2 is a block diagram illustrating a dual-mode mobile terminal 100 according to an embodiment of the present invention. As illustrated in FIG. 2, the dual-mode terminal 100 includes a synchronous CDMA module 2, an asynchronous GSM module 4, a controller 30, a display unit 40, and a timer 50. The controller 30 controls the overall operation of the synchronous CDMA module 2 and the asynchronous GSM module 4. The synchronous CDMA module 2 includes a CDMA antenna 11, a transmission/reception separator 12, a receiver 14, a transmitter 16, and a CDMA modem 18. The CDMA antenna 11 transmits and receives radio signals to and from the synchronous CDMA mobile communication network 10, and is designed to be sensitive to frequencies used in the CDMA mobile communication network. When a radio signal is received from the CDMA mobile communication network 10 through the CDMA antenna 11, the received signal is input to the transmission/reception separator 12 in the CDMA module 2.

The transmission/reception separator 12 in the CDMA module 2 outputs the received signal from the CDMA antenna 11 to the receiver 14. When the transmission/reception separator 12 receives a transmission signal from the CDMA modem 18 via the transmitter 16, the separator 12 outputs the transmission signal to the CDMA antenna 11. The transmitter 16 modulates the data output from the CDMA modem 18, and transmits an RF signal carrying the modulated data through the transmission/reception separator 12 and the CDMA antenna 11. The receiver 14 receives a radio signal through the CDMA antenna 11 via the transmission/reception separator 12, converts the received signal into an intermediate frequency (IF) signal and demodulates it into data. The demodulated signal is then output to the CDMA modem 18. The CDMA modem 18 modulates an audio signal, which is received through a microphone (not shown), into a radio signal, and demodulates a radio signal received through the receiver 14 into an audio signal and outputs it through a speaker (not shown).

The asynchronous GSM module 4 includes a GSM antenna 21, a switch 22, a receiver 24, a transmitter 26, and a GSM modem 28. The GSM antenna 21 transmits and receives radio signals to and from the asynchronous GSM mobile communication network 20, and is designed to be sensitive to frequencies used in the GSM mobile communication network. When a radio signal is received from the GSM mobile communication network 20 through the GSM antenna 21, the received signal is input to the switch 22 in the GSM module 4. The switch 22 in the GSM module 4 outputs the received signal from the GSM antenna 21 to the receiver 24. When the switch 22 receives a transmission signal from the GSM modem 28 via the transmitter 26, the switch 22 outputs the transmission signal to the GSM antenna 21.

The GSM system uses a Time Division Duplex (TDD) scheme, such that channels assigned to uplink and downlink are spaced apart from each other by specified time intervals. In the GSM system, a terminal and a base station transmit and receive in simultaneously intervals of time slots therebetween, such that transmission and reception are not performed in the terminal.

For example, the GSM terminal deactivates its receiver during transmission and deactivates its transmitter during reception. The switch 22 connects an output of the transmitter 26 to the GSM antenna 21 during transmission under the control of the controller 30. However, the switch 22 connects the GSM antenna 21 to an input of the receiver 26 during reception, under the control of the controller 30.

The transmitter 26 modulates data output from the GSM modem 28 and transmits an RF signal carrying the modulated data through the switch 22 and the GSM antenna 21. The receiver 24 receives a radio signal through the GSM antenna 21 via the switch 22, converts the received signal into an intermediate frequency signal, and demodulates it into data. The demodulated signal is then output to the GSM modem 28. The GSM modem 28 modulates an audio signal, which is received through the microphone (not shown), into a radio signal, and demodulates a radio signal received through the receiver 24 into an audio signal and outputs it through the speaker (not shown). The CDMA antenna 11 and the GSM antenna 21 may also be embodied as a single antenna.

The display unit 40 generally includes, for example, a Liquid Crystal Display (LCD) to display various messages, icons and the like under the control of the controller 30. The display unit 40 also displays current time information under the control of the controller 30.

If the user selects the CDMA mode, the controller 30 supplies power to the CDMA module 2 to connect to the CDMA mobile communication system in order to provide a communication service from the CDMA mobile communication system to the user. If the user selects the GSM mode, the controller 30 supplies power to the GSM module 4 to connect to the GSM mobile communication system in order to provide a communication service from the GSM mobile communication system to the user.

According to the present invention, if the terminal is in the GSM mode and is located an area where it can connect to the CDMA mobile communication system, the controller 30 periodically connects to the synchronous CDMA mobile communication system to obtain accurate current time. Based on the obtained accurate current time, the dual-mode terminal 100 corrects its time information to be displayed to the user, and then reconnects to the GSM mobile communication system, thereby enabling communication services via the GSM mobile communication system.

At a specific time, the timer 50 provides an interrupt signal to the controller 30. In the CDMA mode, the controller 30 deactivates the timer 50. In the GSM mode, the controller 30 activates the timer 50 and periodically connects to the synchronous CDMA mobile communication system according to interrupt signals from the timer 50. If the user is currently communicating via the GSM mobile communication system, the controller 30 connects to the CDMA mobile communication system to obtain current time information, after waiting until the communication is terminated. Based on the time information obtained from the CDMA mobile communication system, the controller 30 corrects the time information to be displayed on the display unit 40, and then reconnects to the GSM mobile communication system. Accordingly, the user of the dual-mode terminal receives accurate time information while receiving the GSM communication service.

If the terminal was set to be powered on in the asynchronous mode, the controller 30 enters the synchronous mode to obtain current time information, after the terminal is powered on. Based on the obtained current time information, the controller 30 updates time information to be displayed on the display unit 40 and then switches to the asynchronous mode. Thereafter, the controller 30 periodically updates the time information to be displayed on the display unit 40 using the timer.

Figure 3:
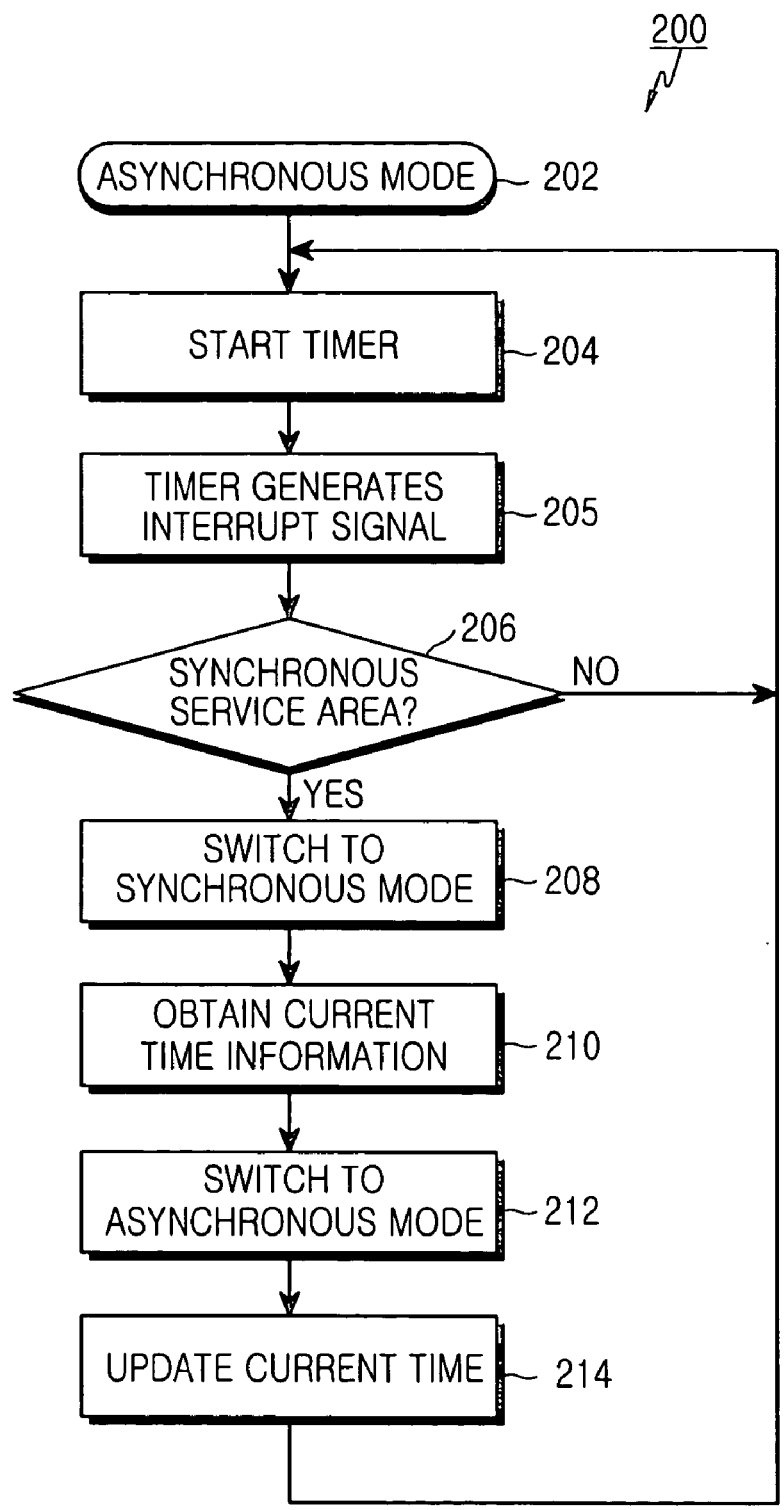
FIG. 3 is a control flow diagram illustrating a procedure for displaying time information in the dual-mode terminal according to an embodiment of the present invention.
Figure 4:
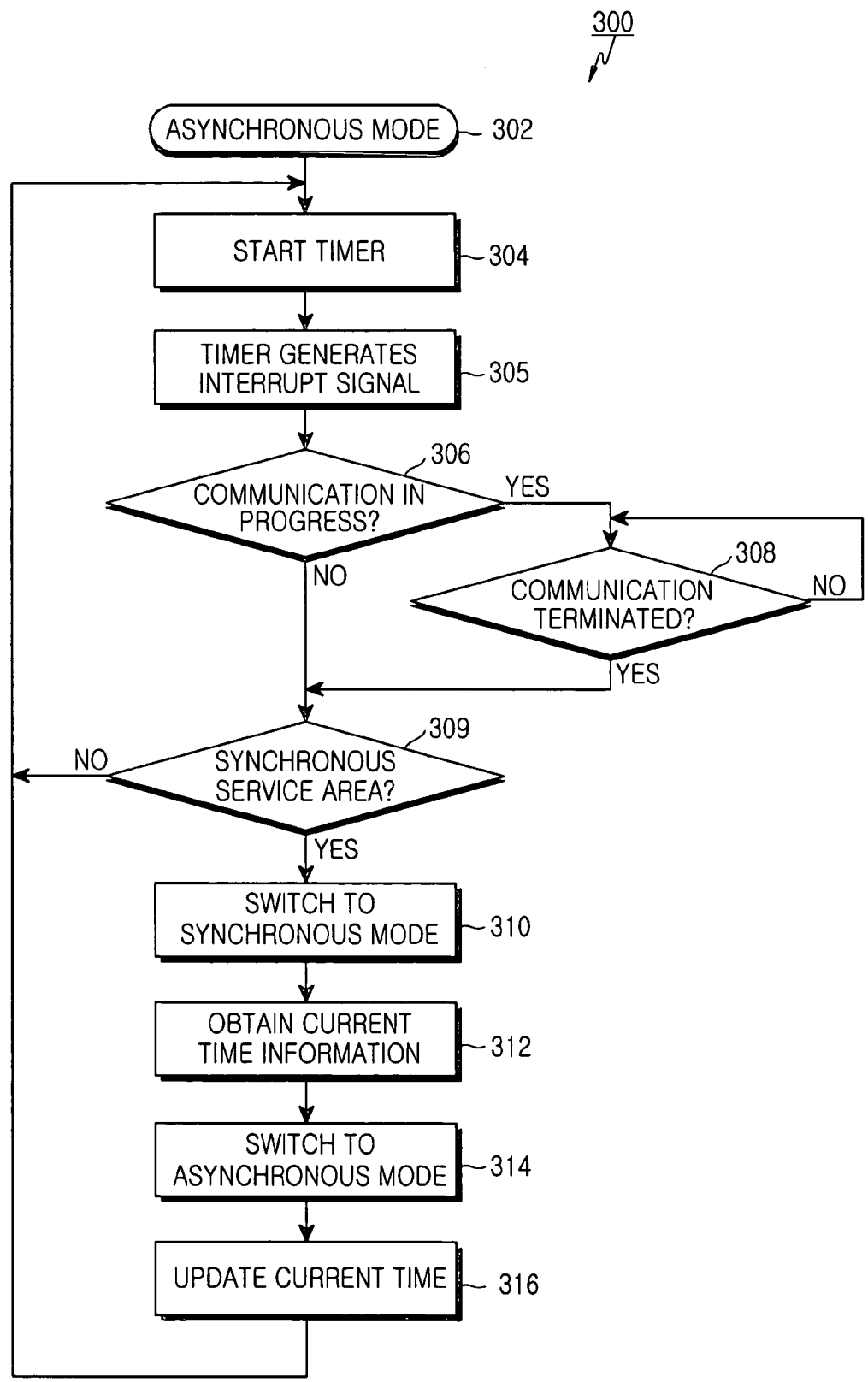
FIG. 4 is a control flow diagram illustrating a procedure for displaying time information in the dual-mode terminal according to another embodiment of the present invention.

FIGS. 3 and 4 are control flow diagrams illustrating procedures for displaying time information in the dual-mode terminal according to embodiments of the present invention.

Referring to FIG. 3, at step 202, when starting operation, the controller 30 in the dual-mode mobile terminal enters the asynchronous communication mode as selected by the user. As described above, the asynchronous communication mode is a GSM mode in which the dual-mode mobile terminal connects to the GSM mobile communication system to receive a communication service therefrom. After entering the asynchronous communication mode, the controller 30 starts the timer 50 in step 204. At a specific time, the timer 50 provides an interrupt signal to the controller 30 as described above. Accordingly, at step 205, the controller 30 receives the interrupt signal from the timer 50 at the specific time.

At step 206, the controller 30 determines if the terminal is currently located in an area in which it can connect to the synchronous CDMA mobile communication system. If the terminal is currently located in an area in which it can connect to the synchronous CDMA mobile communication system, the controller 30 switches to the synchronous CDMA mode and communicate with the CDMA mobile communication system in step 208.

The controller 30 then obtains an accurate current time from the CDMA mobile communication system at step 210, and connects to the asynchronous GSM mobile communication system to switch to the asynchronous communication mode at step 212. Based on the current time information obtained from the synchronous mobile communication system, the controller 30 then corrects and updates time information to be displayed on the display unit 40 at step 214. The controller 30 then returns to step 204.

Referring to FIG. 4, at step 302, when starting operation, the controller 30 in the dual-mode mobile terminal enters the asynchronous communication mode as selected by the user. After entering the asynchronous communication mode, the controller 30 starts the timer 50 in step 304. At step 305, the controller 30 receives an interrupt signal from the timer 50 at a specific time. At step 306, the controller 30 determines if the terminal is currently performing communication via the asynchronous mobile communication system. If the terminal is currently performing communication via the asynchronous mobile communication system, the controller 30 waits until the communication is terminated at step 308. If the communication is terminated at step 309, the controller 30 determines if the terminal is currently located in an area in which it can connect to the synchronous CDMA mobile communication system. If the terminal is currently located in an area in which it can connect to the synchronous CDMA mobile communication system, the controller 30 connects to the CDMA mobile communication system to switch to the synchronous CDMA mode in step 310.

The controller 30 obtains an accurate current time from the CDMA mobile communication system at step 312, and connects to the asynchronous GSM mobile communication system to switch to the asynchronous communication mode at step 314. Based on the current time information obtained from the synchronous mobile communication system, the controller 30 then corrects and updates time information to be displayed on the display unit 40 at step 316. The controller 30 then returns to step 304.

As is apparent from the above description, even in the asynchronous communication mode, a dual-mode mobile terminal according to the present invention periodically enters a synchronous communication mode to obtain accurate time information. As a result, the user can always receive the accurate time information.

Although the preferred embodiments of the present invention have been disclosed for illustrative purposes, those skilled in the art will appreciate that various modifications, additions, and substitutions are possible, without departing from the scope and spirit of the present invention as disclosed in the accompanying claims. Accordingly, the scope of the present invention should not be limited to the above embodiments, but defined by the accompanying claims as well as equivalents thereof.

What is claimed is:

1. A dual-mode mobile terminal for a user, comprising:
   a timer for generating an interrupt signal at a predetermined time, the dual-mode mobile terminal accessing at a time one of an asynchronous mobile communication system and a synchronous mobile communication system, the user being able to select one of the asynchronous mobile communication system and the synchronous mobile communication system for the dual-mode mobile terminal to transmit a call to the selected system; and
   a controller for the asynchronous mobile communication system and the synchronous mobile communication system,
   wherein the controller starts the timer when entering an asynchronous communication mode corresponding to a selection of the asynchronous mobile communication system by the user, connects to the synchronous mobile communication system to obtain accurate time information therefrom when receiving the interrupt signal from the timer, reconnects to the asynchronous mobile communication system after obtaining the accurate time information, and deactivates the timer when entering a synchronous communication mode corresponding to a selection of the synchronous mobile communication system by the user.

2. The terminal according to claim 1, wherein the controller, when receiving the interrupt signal from the timer, determines if communication is currently performed via the asynchronous mobile communication system, and if the communication is currently performed, the controller connects to the synchronous mobile communication system after the communication is terminated.

3. The terminal according to claim 1, wherein the synchronous mobile communication system is a Code Division Multiple Access (CDMA) mobile communication system.

4. The terminal according to claim 1, wherein the asynchronous mobile communication system is a Global System for Mobile Communication (GSM) mobile communication system.

5. The terminal according to claim 1, wherein when the terminal is set to be powered on in the asynchronous communication mode, the controller enters the synchronous communication mode to obtain current time information, after the terminal is powered on, and switches to the asynchronous communication mode after obtaining the current time information.

6. A method for providing time information in a dual-mode mobile terminal to a user, the method comprising the steps of:

starting a timer in the dual-mode mobile terminal when entering an asynchronous communication mode corresponding to a selection of the asynchronous mobile communication system by the user, the dual-mode mobile terminal for accessing at a time one of an asynchronous mobile communication system and a synchronous mobile communication system, the user being able to select one of the asynchronous mobile communication system and the synchronous mobile communication system for the dual-mode mobile terminal to transmit a call to the selected system, said timer generating an interrupt signal at a predetermined time;

connecting to the synchronous mobile communication system to obtain accurate time information therefrom when the interrupt signal is generated;

reconnecting to the asynchronous mobile communication system, after the accurate time information is received; and deactivating the timer when entering a synchronous communication mode corresponding to a selection of the synchronous mobile communication system by the user.

7. The method according to claim 6, further comprising the steps of:

determining if communication is currently performed via the asynchronous mobile communication system, and if the timer generates the interrupt signal; and connecting to the synchronous mobile communication system after the communication is terminated, when it is determined that the communication is currently performed via the asynchronous mobile communication system and the timer generates the interrupt signal.

8. The method according to claim 7, further comprising the step of:

if the terminal is set to be powered on in the asynchronous communication mode, entering the synchronous communication mode to obtain current time information, after the terminal is powered on and switching to the asynchronous communication mode, after obtaining the current time information.

* * * * *